H. & J. H. WILLIAMS.
AUTOMATIC DOFFER FOR SPINNING MACHINES.
APPLICATION FILED JULY 27, 1908.

1,150,649.

Patented Aug. 17, 1915.
6 SHEETS—SHEET 6.

WITNESSES:
L. B. Woerner.
W<u>m</u> Hurte.

INVENTORS
Humphrey Williams,
John H. Williams.
By Minturn & Woerner.
ATT'YS.

UNITED STATES PATENT OFFICE.

HUMPHREY WILLIAMS AND JOHN H. WILLIAMS, OF INDIANAPOLIS, INDIANA, ASSIGNORS, BY MESNE ASSIGNMENTS, TO HOWARD D. COLMAN, LUTHER L. MILLER, AND HARRY A. SEVERSON, COPARTNERS AS BARBER-COLMAN COMPANY, OF ROCKFORD, ILLINOIS.

AUTOMATIC DOFFER FOR SPINNING-MACHINES.

1,150,649.  Specification of Letters Patent.  Patented Aug. 17, 1915.

Application filed July 27, 1908. Serial No. 445,658.

*To all whom it may concern:*

Be it known that we, HUMPHREY WILLIAMS and JOHN H. WILLIAMS, citizens of the United States, residing at Indianapolis, in the county of Marion and State of Indiana, have invented certain new and useful Improvements in Automatic Doffers for Spinning-Machines, of which the following is a specification.

This invention relates to automatic means for replacing full bobbins on spinning frames with empty bobbins.

In the accompanying drawings, which illustrate one embodiment of our invention.

Figure 1:
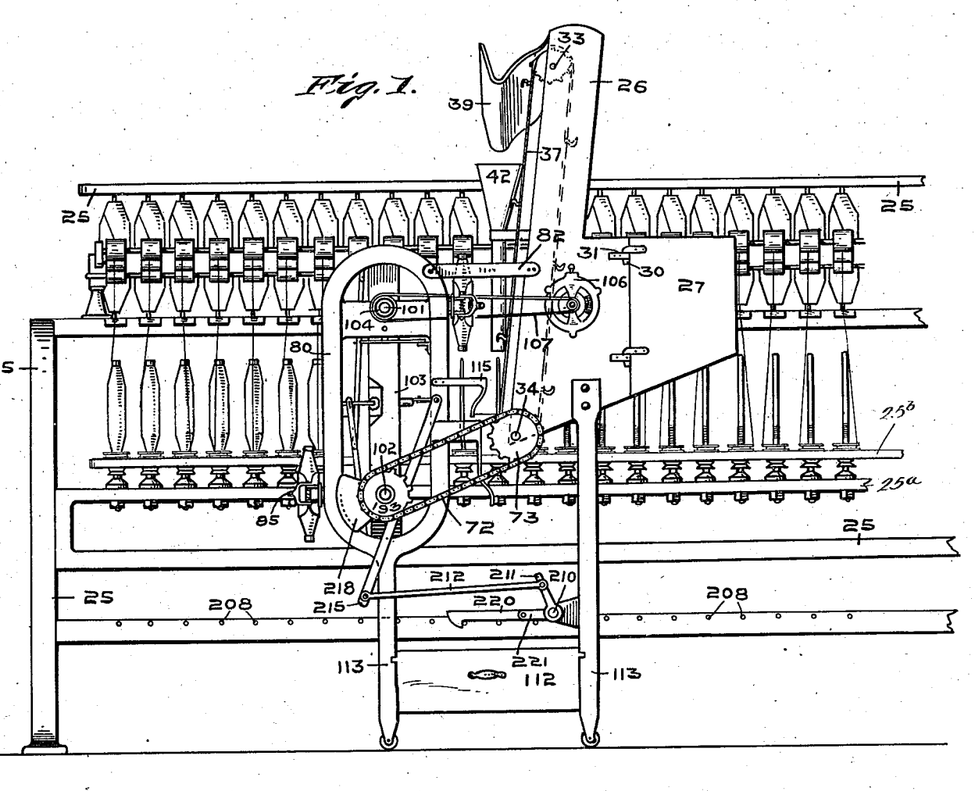
Figure 1 is a front elevation of the doffer in operating position upon a spinning frame.
Figure 2:
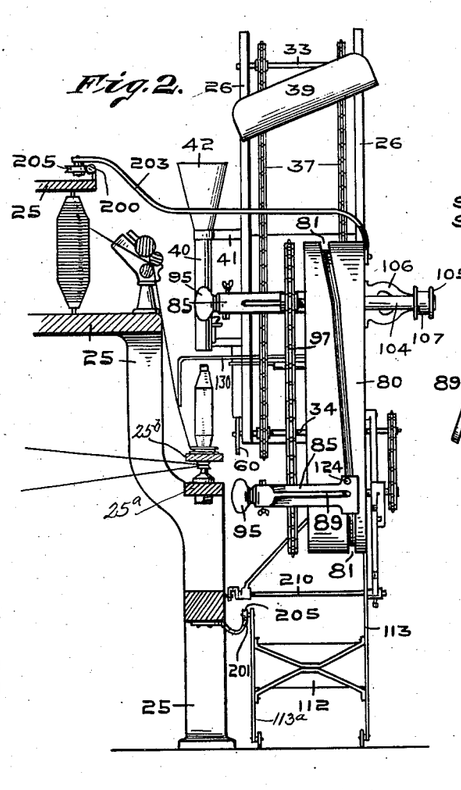
Fig. 2 is an elevation of the left-hand side of the doffer, the adjacent portions of the spinning frame being shown in cross section.

In the drawings, 25 indicates the spinning frame, 25ª the spindle rail thereof, and 25ᵇ the ring rail. The doffer is arranged to travel along the spinning frame from right to left, as viewed in Fig. 1.

Figures 4, 14, 15, 16, 17, 20:
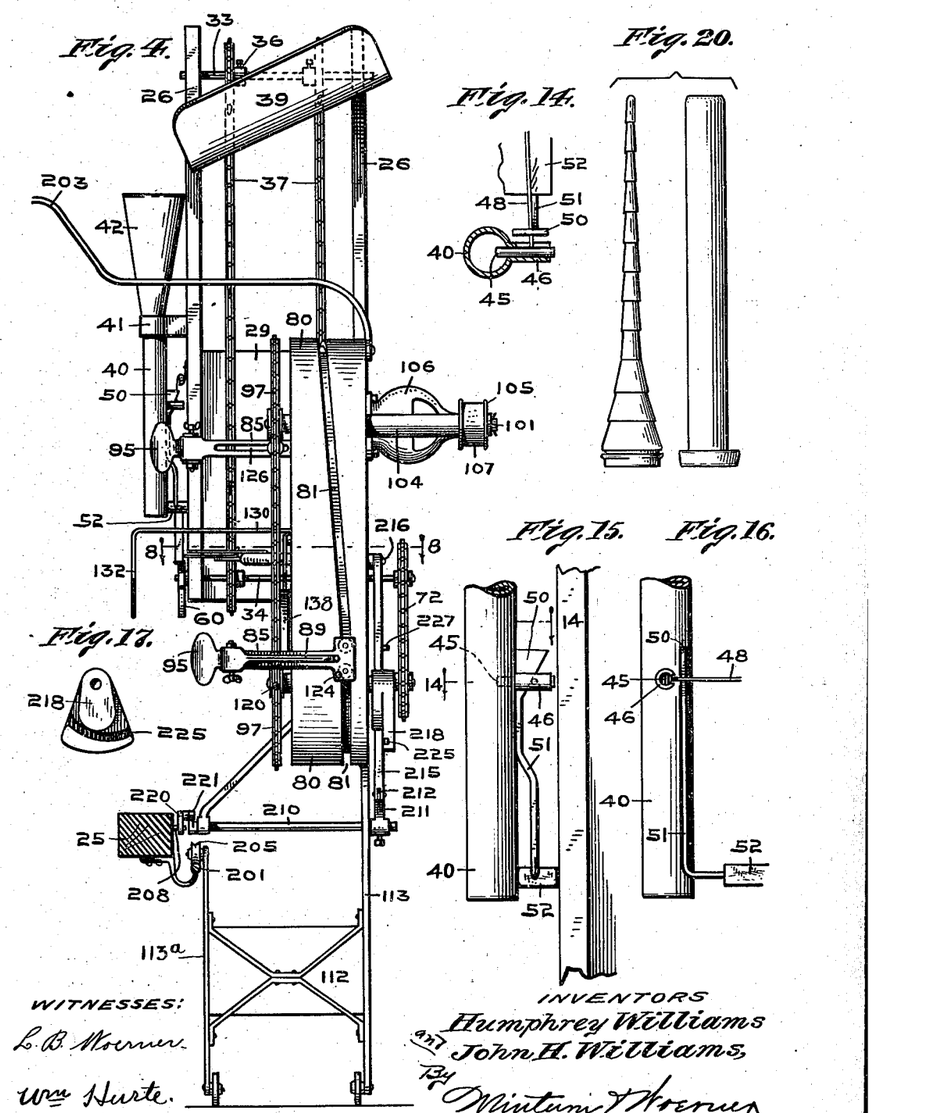
Fig. 4 is an elevation of the left-hand side of the construction shown in Fig. 3.
Fig. 14 is a fragmentary detail horizontally sectional view of the latch for releasing the bobbin, on the line 14—14 in Fig. 15.
Fig. 15 is a detail view in end elevation of the construction shown in Fig. 14.
Fig. 16 is a side elevation of the construction shown in Fig. 15.
Fig. 17 is a rear elevation of the cam for actuating the mechanism to move the doffer along the spinning frame.
Fig. 20 illustrates the two forms of bobbins in general use on spinning machines, which are capable of being handled in the doffer.

26 represents two vertically disposed parallel members which form a portion of the doffer frame and the magazine 27 for the bobbins which are to be fed to the spinning machine. The two members 26 are provided with an incline floor 28, the incline extending toward the left-hand end so that the bobbins will be automatically fed, by gravity, to the hoisting-chains. The left end of the magazine, between the upright members 26, is closed by the vertical wall 29 (see Fig. 4). A portion of the magazine is removably secured by means of the hooks 30 and the eyes 31, so that when the removable portion of the magazine is empty said removable portion may be disconnected and a loaded one substituted. This construction will obviate the necessity for stopping the doffer when the same is in operation. The vertically disposed members 26 also form a support for the transverse shafts 33 and 34, the former being located at the top and the latter at the bottom of said members.

The shaft 34 is positioned immediately in advance of the discharge end of the incline floor 28. The two shafts are each provided with a pair of sprocket wheels 36, the pair on one shaft registering with those on the other, and the sprocket wheels form the support for the hoisting chains 37 which are provided with the hooks 38 and are adapted to elevate the bobbins from the magazine. The hooks 38 on the two chains 37 are arranged to register with one another, and their degree of projection and curvature is such that a pair of hooks will remove and elevate but one bobbin at a single operation from the magazine, thereby preventing congestion to interfere with the operation of the doffer. The bobbins thus being singly removed from the magazine are elevated for the purpose of changing them from a horizontal to a vertical position—the latter position being necessary before the placing of the bobbins upon the spindles in the spinning machine frame can be effected. The placing of the bobbins in a vertical position is accomplished by discharging them from the sprocket chains 37, after they have been carried over the upper sprocket wheels 36, and permitting them to drop into an inclined trough 39, secured to the members 26.

The trough 39 being inclined partially changes the position of the bobbin from the horizontal to the vertical. The degree of inclination imparted to the trough 39 is sufficient to cause the discharged bobbins to immediately slide or pass out of its lower end and into the mouth of a vertically disposed feed-tube 40, which is secured to one of the members 26 by means of the bracket 41. See Fig. 4 of the drawings.

The upper end of the feed-tube 40 is provided with a flared or funnel-shaped end-piece 42. The tube 40 is arranged to stand in vertical alinement with the row of spindles on the spinning frame in order that the bobbin may accurately be placed upon the spindle at the proper time. The bobbins when fed into the tube 40 do not pass directly through said tube but are momentarily held therein until the discharge end of the tube has been brought into perfect registration with a bare spindle.

The tube 40 is provided with a bobbin retention device, which causes a momentary pause of the bobbin within said tube, which consists of a horizontally disposed catch-pin 45, the latter being mounted in a tubular guide 46 which is secured to the tube 40. See Figs. 15 and 16. The catch-pin 45 in its normal position obstructs the passageway of the tube 40, the pin being held in such position by means of the spring 48. The pin 45 is withdrawn laterally from the tube 40, to permit the discharge of the bobbin at the proper time, by means of a wedge-shaped plate 50, provided with an integral stem 51 which extends to and engages the hinge-block 52. The hinge-block 52 is pivoted at 54 to the inner member 26 of the doffer frame, and is provided with the weight or hammer 56 which, on the descent of the hinge-block 52, drives the bobbin, previously positioned, tightly upon the spindle.

The catch-pin 45 in the tube 40 is actuated at the proper time, thereby releasing one of the bobbins, by means of the cam 60 coming into contact with a dependent arm 59 on the hinge-block 52 through which the wedge-shaped plate is actuated.

The cam 60 is mounted on the transverse shaft 34 which supports the sprocket wheel 36 carrying the hoisting chain 37. By mounting the cam 60 upon the shaft 34 the hoisting chains 37 may be timed so as to feed a bobbin into the tube 40 in proper relation to the time when the cam 60 is effecting a discharge of a bobbin from said tube. The cam 60 also operates the kicker-shaft 65, mounted in a parallel plane in the rear of the shaft 34 and below the incline floor 28 of the magazine.

The shaft 65 carries the kicker 66 which has a movement back and forth through inclined floor 28 of the magazine. The purpose of the picker 66 is to keep the bobbins in the magazine in proper alinement as they are being fed on the hoisting chains 37. The rocking movement imparted to the shafts 65 and kicker 66 is secured by providing said shaft with the crank arm 67 which is engaged by a link 70 extending to and eccentrically connecting with the cam 60.

The hoisting chains 37 and the other mechanism heretofore described are driven by means of a sprocket chain 72 which engages the sprocket wheel 73 mounted on the transverse shaft 34. The sprocket chain 72 extends to and connects with the other portion of the machine which will now be described.

Situated to the left of the magazine 27 in a vertical position is the frame 80 having parallel sides and rounded ends. The frame 80 is provided with a continuous groove 81 which forms a guide-way for directing the bobbin-gripping devices in a determined course. The frame 80 is secured by means of the brace-rods 82 and 83. See Fig. 3.

Figures 3, 18, 19:
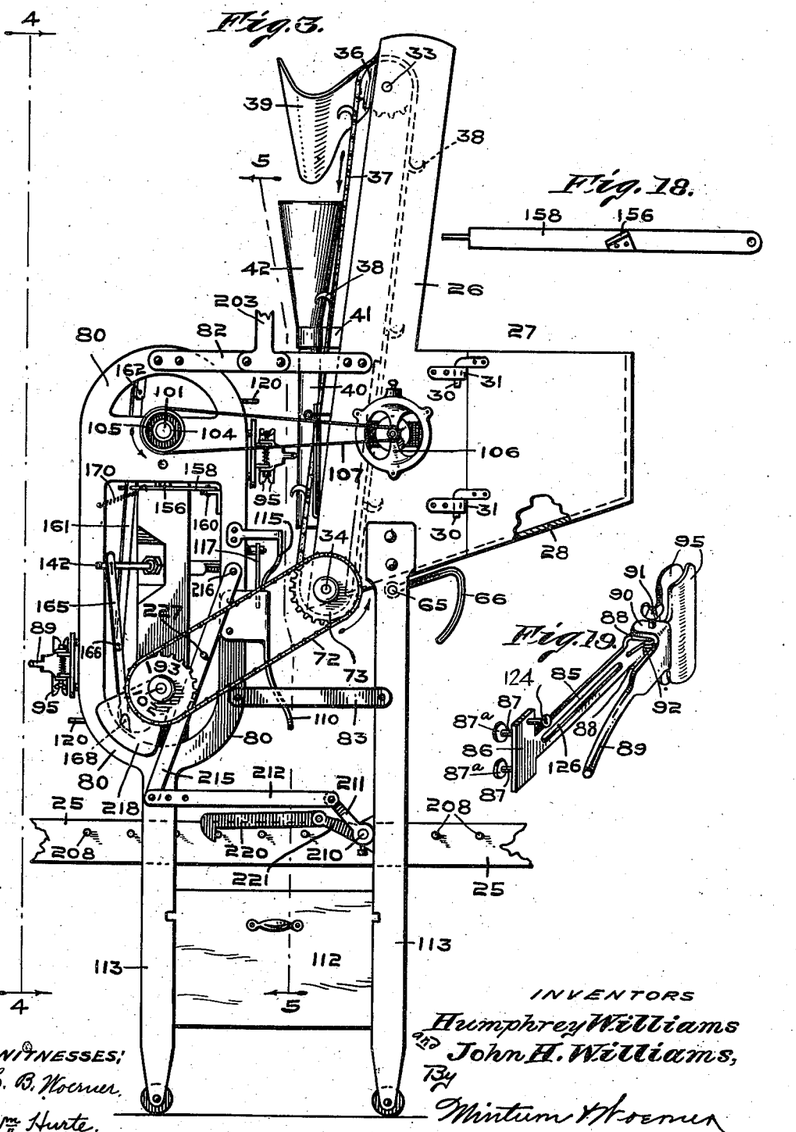
Fig. 3 is a front elevation of the doffer on a considerably enlarged scale, in which the spinning frame is omitted.
Fig. 18 is a plan view of the lever provided with the throw-out shoulder.
Fig. 19 is a perspective view of one of the bobbin-gripping devices.
Figure 10:
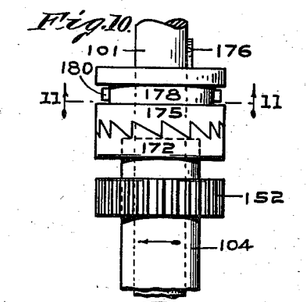
Fig. 10 is an enlarged detail plan view of the gear and ratchet device.

The bobbin-gripping device for removing the full bobbins from the spindles on the spinning frame is best shown in Fig. 19 and consists of the bar 85 which is provided with the integral T-shaped head 86 adapted to carry the studs 87. These studs project into the guideway 81 of the frame 80 and are provided with the heads 87ᵃ adapted to prevent lateral displacement of the gripping device. The bar 85 is provided with a pair of integral ears 88 which provide a bearing for the outer bar 89 of the gripping device, and the bar 89 is provided with the ears 90, which correspond to and overlap the ears 88. A pivot pin 91 passes through the ears 88 and 90 and forms the pivot between the two bars 85 and 89. A spring 92 is coiled around the pivot pin 91 and provides the tension for holding the jaws 95 of the bobbin-gripping devices together. The gripping devices are forced to travel around the periphery of the frame 80 by means of the sprocket chain 97 (see Fig. 7) mounted on the sprocket wheels 99 and 100. The sprocket wheel 99 is mounted on the transverse shaft 101, located in the upper end of the frame 80, and the sprocket wheel 100 is mounted on a similar shaft 102 located in the lower end of the frame 80. The shafts 101 and 102 find bearings in the upright 103 secured within the frame 80. The outer end of the shaft 101 is provided with a loose sleeve 104 (see Fig. 10) which carries the pulley 105 which is connected to the motor 106 by means of the belt 107. The sleeve 104, through a ratchet mechanism which will be hereinafter described, intermittently rotates the shaft 101 in the direction indicated by the arrows, by which means the bobbin-gripping devices are moved around the periphery of the frame 80.

It will be noted by examining Figs. 2, 4, 5, and 8, that the guideway 81, in the frame 80, is not cut to follow a true plane throughout its course, but said course varies so as to shift the bobbin-gripping devices to and from the spindles on the spinning frame, and the object of this variation in the course of the guideway 81 is to permit the devices, after a bobbin is gripped, to clear the spinning frame during the downward movement of the gripping devices on the opposite side of the frame 80. The guideway 81 is provided with an inclined portion 108 (see Fig. 5), and the object of said inclined portion will be hereinafter described. When the sprocket chain 97 brings the gripping devices to the foot of the inclined portion 108 of the guideway 81, the gripping devices are occupying their farthermost position from the spindle on the spinning machine frame, and the arrangement of said incline is such that when the gripping devices reach the top thereof they will have moved inwardly toward the spinning frame a sufficient distance to enable the jaws 95 to grip the full bobbin and, with the continued movement of the sprocket chain 97, will cause the bobbin to be removed from the spindle and carried upwardly along the side of the frame 80. The inclined portion 108 of the guideway is made with two leads so as to accommodate the studs 87 on the T-shaped heads on the bars 85 of the gripping devices. During the upward movement of a bobbin toward the top of the frame 80 it is gradually moved longitudinally away from the spinning frame, by the inclination in the course of the guideway 81. This changing position of the gripping device enables the bobbin to be carried out of the spinning frame without interference. The bobbin is carried downwardly on the opposite side of the frame 80 and thence carried around the lower end thereof and then upward, when the bar 89 of the gripping device is engaged by a cam-plate 110 (Fig. 3) secured to the side of the frame 80, the said cam-plate being bent so as to force the end of the bar 89 toward the companion bar 85, thereby causing the jaws 95 to open and release the bobbin, the latter dropping into a receptacle 112 removably mounted between the legs 113 and 113ª of the doffer frame. The cam-plate 110 is of sufficient length to hold open the jaws 95, until the gripping device moves across the inclined portion 108 in the guideway 81 and embraces the bobbin to be removed from the spinning machine frame. When the jaws reach this position the free end of the bar 89 passes over the upper end of the cam-plate 110, causing the jaws 95 to impinge upon the bobbin under the action of the spring 92. As the free end of the bar 89 passes over the end of the cam-plate 110 it drops upon a second cam-plate 115 (the cam-plates 110 and 115 are best shown in Fig. 3) which, on the upward travel of the gripping device, induced by the sprocket chain 97, forces the bar 89 of the gripping device outward, momentarily, so that the jaws 95 will more firmly impinge the bobbin, at the moment the latter is being displaced from the spindle. The additional tension applied to the gripping device by the cam-plate 115 will prevent the jaws 95 from slipping, in case a bobbin is too tightly wedged upon the spindle. When the bobbin is free of the spindle the bar 89 passes over the end of the cam-plate 115, at which time the springs 92 will provide ample tension for holding the bobbins until discharged by the action of the cam-plate 110.

Figures 5, 6, 7:
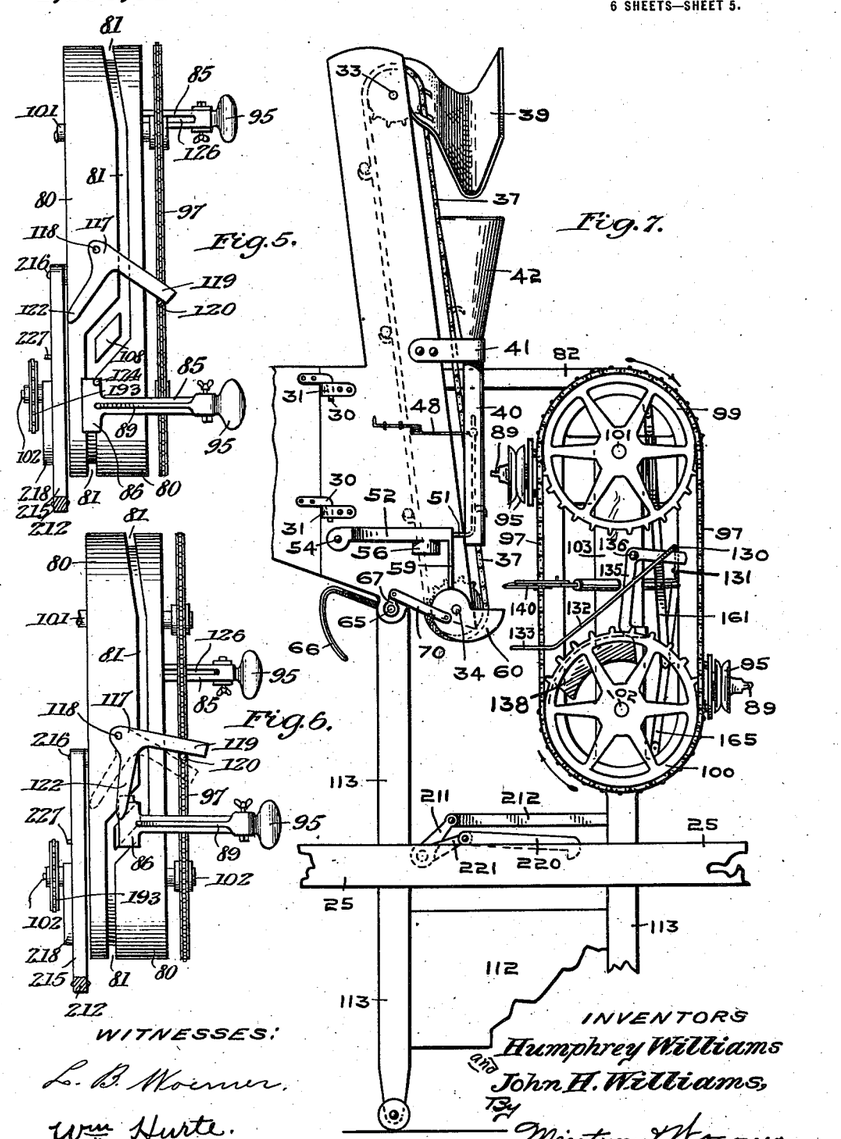
Fig. 5 is an elevation of the right-hand side of the frame for guiding the bobbin-gripping devices.
Fig. 6 is a view similar to Fig. 5 except that the gripping devices are shown in different positions.
Fig. 7 is a rear elevation of the construction shown in Fig. 3.
Figure 8:
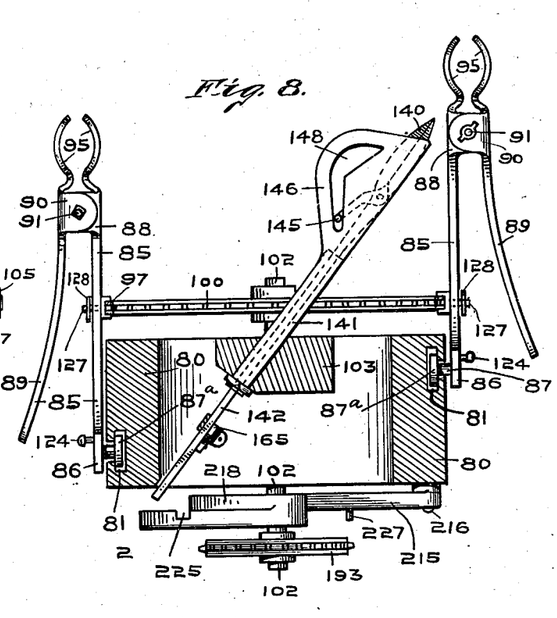
Fig. 8 is a horizontal sectional view of the guide-frame for the bobbin-gripping devices, on the line 8—8 Fig. 4.

To prevent binding between the bars 85 of the gripping devices and the inclined portion 108 of the guideway 81, we provide a helper comprising an L-shaped plate 117 which is pivoted at 118 to the side of the frame 80 and normally occupies the position shown in Fig. 5 of the drawings. The prong 119 of the L-shaped plate 117 projects across the face of the chain 97 and is engaged and operated by a pin 120 secured to said chain 97, whereby the prong 119 is elevated with the upward movement of the chain 97, as clearly shown in Fig. 6 of the drawings. When the plate 117 is thus acted upon, its rear prong 122 engages the pin 124 mounted on the T-shaped head 86 of the bar 85 of the bobbin-gripping devices, so that the bar 85 is helped up the inclined portion 108 of the guideway 81. As before stated, the gripping devices are moved around the frame 80 by the sprocket chain 97, and the gripping devices are moved transversely of said chain by the action of the inclined portion 108 of the guideway 81, which movement is permitted by providing the bars 85 with the slots 126 (see Fig. 19) to receive the lugs 127 on the sprocket chain 97, and to prevent separation between the bars 85 and the lugs 127 the latter are provided with the heads 128. See Fig. 8.

To prevent the jaws of the bobbin-gripping devices from clamping the threads leading to the spinning frame, we provide a beater comprising a wire 130 (see Fig. 7) which is pivoted to the frame 80 at 131 and extends toward the spinning frame to a point immediately in the rear of the line of spindles in said frame. At this point the wire 130 has an abrupt right angle bend with a downwardly sloping inclined portion 130

132 that terminates in a horizontal portion 133. The wire 130 passes over one end of the bell crank lever 135 which is pivoted at 136 and extends downwardly into the path and is actuated at each rotation of the cam 138 secured to the sprocket wheel 100, whereby a vertical reciprocating movement is imparted to the wire 130. As the thread passes under the horizontal portion 133 of the wire 130 in reaching the traveler on the spinning ring, it will be seen that the wire 130 will act as a beater to keep the thread, coming from the spinning frame, away from the bobbin when the latter is grasped by the jaws 95. As the gripping device removes the bobbin from the spindle a few winds of the thread will unravel from the bobbin to allow the latter to move upwardly without breaking the thread, and as the thread is severed the unraveled end, leading to the traveler, will coil around the spindle from which the bobbin is removed.

When an empty bobbin is placed upon the spindle, said coils of thread will become clamped between the spindle and the bobbin, so that when the spinning frame is again set in operation the thread will be wound upon the bobbin.

Figure 9:
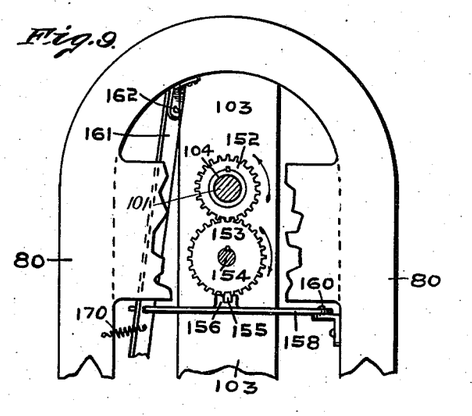
Fig. 9 is a detail view in elevation of the upper end of the frame for guiding the bobbin-gripping devices.
Figure 12:
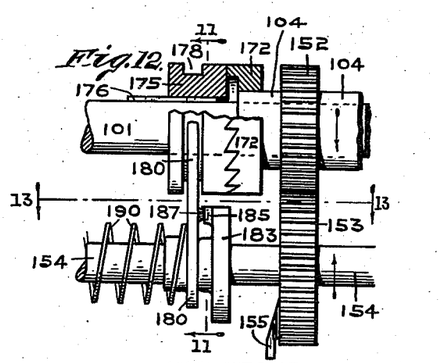
Fig. 12 is a side elevation of the gear and ratchet device.
Figure 13:
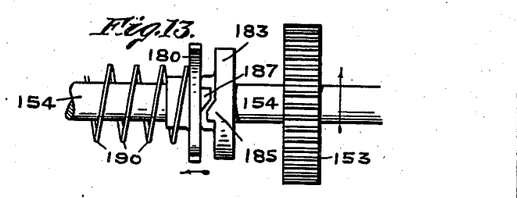
Fig. 13 is a detail view in plan of the lower shaft for supporting part of the gear and ratchet device.

It has heretofore been mentioned that the thread is severed after the removal of the full bobbin from the spindle, so that the bobbin may be safely carried away by the bobbin-gripping devices. The severing of the thread is accomplished by means of a pair of horizontally arranged shears 140. This pair of shears is movably mounted and is guided in a determined plane by means of a hollow tube 141, mounted in the upright 103 within the frame 80. A shaft 142, made square, to prevent the shears from turning, slides longitudinally through a corresponding hole in the tube 141, and is integrally secured to one of the blades of the shears 140. See Fig. 8. The companion blade of the shears 140 is provided with a vertically disposed integrally formed stub 145. A plate 146 is rigidly secured to the tube 141 and is provided with an angular slot 148 adapted to receive the stud 145 on the shears. When the shaft 142 is moved longitudinally toward the spinning frame the stud 145 will be forced to follow the course of the slot 148 in the plate 146. The slot 148 is formed to cause the blades of the shears to open and close as the stud 145 moves toward the forward end of said slot. The closing of the blades of the shears severs the thread after the bobbin is removed from the spindle. The shears 140 projects into close proximity to the spindle from which the bobbin is removed, and the shears is actuated through the shaft 142 by a ratchet mechanism illustrated in Fig. 12 in the drawings, which mechanism in addition to alternately operating the shears is arranged to stop the other mechanism of the doffer during the time the shears severs the thread. The means for imparting movement to the shears and the bobbin-removing and supplying mechanisms, alternately, includes the sleeve 104 rotatably mounted on the shaft 101. See Figs 10 and 12. The sleeve 104 has fixed thereto the pulley 105 which is continuously driven from the motor 106 through the belt 107. The sleeve 104 is provided with the fixed pinion 152 which meshes with a pinion 153 on the parallel shaft 154, mounted immediately below shaft 101. By this construction a continuous rotary movement is imparted to the shaft 154. The pair of shears 140 is operated by providing the pinion 153 with a cam lug 155 (see Figs. 9 and 12) which lug, at each rotation of the pinion, comes into contact with a cam shoulder 156 mounted diagonally on the lever 158. See Fig. 18. The lever 158 stands horizontally and immediately below the pinion 153 and is pivoted at 160. The opposite end of the lever 158 engages a vertically disposed lever 161 which is pivoted to the frame 80 at 162. The lever 161 extends downwardly and pivotally engages the central portion of the lever 165 at 166, and the latter lever is pivoted at 168 to the lower end of the frame 80 and extends to and pivotally engages the squared shaft 142 for actuating the shears 140.

The peculiar arrangement of the levers 158, 161 and 165 multiplies the shifting quality of the cam shoulder 156 sufficiently to advance the shears 140 to reach and sever the thread. The shears is operated during the brief period of time required for the cam lug 155 on the pinion 153 to pass across the face of the shoulder 156 on the lever 158, during which brief period the other mechanisms of the doffer are at rest. When the cam lug 155 is removed from the cam shoulder 156 the levers 158, 161, 165 and shears 140 are returned to their normal positions, by means of a spring 170.

Figure 11:
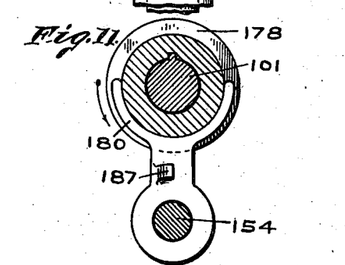
Fig. 11 is a cross section on the line 11—11 in Figs. 10 and 12.

Fixed to the sleeve 104 is a ratchet-toothed clutch disk 172. A companion ratchet faced disk 175 is slidably arranged on the shaft 101 adjacent to the disk 172. The disk 175 is mounted on the shaft 101, by means of the feather 176 and is susceptible of being moved longitudinally on said shaft into and out of engagement with the ratchet faced disk 172 on the sleeve 104. The hub of the slidable disk 175 is provided with an annular groove 178 which is engaged by a shifting-yoke 180, the latter being movably mounted on the parallel shaft 154. Mounted on the continuously running shaft 154 and in the rear of the pinion 153 is the fixed disk 183 which is provided with an integral cam-lug 185. At each rotation of the shaft 154 the cam-lug 185 comes into contact with a corresponding lug 187 (see Figs 11 and 12) formed integrally on the shifting-yoke 180, whereby said yoke is moved longitudinally on the shaft 154 away from the disk 183. This longitudinal movement of the yoke shifts the ratchet faced disk 175 on the shaft 101 to disconnect said disk from the companion disk 172 on the sleeve 104, thereby causing the chains 97 for operating the bobbin-gripping devices and the hoisting chains 37 to stand idle. When the cam-lug 185 passes off the cam-lug 187, the ratchet faced disk 175 and the yoke 180 are returned to their normal positions by means of the spring 190. Since the shaft 101 is caused to pause in its rotation to enable the shears 140 to be actuated, provision must be made to keep the shafts 101 and 154 timed in uniformity with each other. This is accomplished by providing the pinion 152 on the sleeve 104 with twenty-two teeth and the pinion 153 on the shaft 154 with twenty-six teeth. The contact between the lug 155 and the cam-shoulder 156 is sufficient to permit a disconnected rotation between the ratchet faced disks 172 and 175, equivalent to four teeth on the pinion 153 so that both pinions will have a uniform operative relation.

The shaft 102 in the lower end of the frame 80 is provided at one end with the sprocket wheel 193 adapted to carry the sprocket chain 72, whereby movement is imparted to the hoisting chains 37 through the sprocket wheel 73 on the transverse shaft 34. See Fig. 1.

The doffer is moved step-by-step along the front side of the spinning frame to bring the discharge end of the tube 40 and the jaws 95 of the bobbin-gripping devices into accurate registration with the spindles so that the bobbins may accurately be placed upon and removed from said spindles in consecutive order. Rails 200 and 201 are located at convenient points upon the spinning frame. Attached to the doffer is an arm 203 having a roller 205 that runs upon the rail 200. Other rollers 205 are arranged upon the frame-members 113ª and roll upon the rail 201. On the spinning frame is a series of pins 208 which are placed in vertical alinement with the spindles. See Figs. 1 and 3. The supporting legs 113 on one side of the doffer frame form the support for the rock-shaft 210 which shaft is provided at its forward end with the crank-arm 211, to which the connecting-link 212 is pivotally attached. The link 212 extends to and engages the lower end of the rocker-arm 215 which pivotally engages the frame 80 at 216 at its upper end. The rocker-arm 215 normally lies against the periphery of the cam 218 mounted on the shaft 102. At each rotation of the cam 218 the rocker-arm 215 is moved toward the right which imparts a partial rotation to the rock-shaft 210. This movement of the shaft 210 exerts a pull upon the hook 220, through the crank-arm 221, the hook being in contact with one of the pins 208 on the spinning machine frame 25, causing the doffer frame to be moved from one of the pins 208 to the other. The rocker-arm 215 is not only forced to travel toward the right by the action of the cam 218 but said cam returns said arm to its normal position. This is accomplished by providing the cam 218 with the cam-groove 225 (see Fig. 17) which engages a pin 227 on the rocker-arm 215.

The operation of the doffer is as follows: When the motor 106 is started, movement is imparted to the loose sleeve 104 on the shaft 101 through the pulley 105 and the belt 107, and through the companion ratchet faced disks 172 and 175 the shaft 101 is intermittently rotated. The shaft 101 through the sprocket wheel 99 and the sprocket chain 97, carrying the bobbin-gripping devices rotates the shaft 102. The latter shaft carries the sprocket wheel 193, and by means of the sprocket chain 72, the shafts 33 and 34 and the hoisting chains 37 are driven. The shaft 34 in turn operates the catch-pin 45 in the tube 40 to discharge and place the bobbins on the spindle. The sleeve 104, through the pinions 152 and 153, operates the shaft 154, and the latter pinion is provided with the lug 155 for actuating the levers 158, 161, and 165 whereby the shears 140 is operated. The shaft 154, through the disk 183 and shifting yoke 180, moves the ratchet faced disk 175 into and out of engagement with the companion disk 172 on the sleeve 104, whereby a pause in the rotation of the shaft 101 and the mechanism driven therefrom is effected. The shaft 102, driven by the sprocket chain 97, also actuates the rocker-arm 215 through the cam 218, and the arm rocks the shaft 210 which, by means of the crank-arm 221, actuates the hook 220, whereby the doffer is automatically and intermittently moved along the spinning frame.

Having thus fully described our said invention, what we desire to secure by Letters Patent, is—

1. An automatic bobbin doffer for spinning machines including the doffer frame, bobbin-gripping devices adapted to remove the full bobbins from the spinning machine, a frame to support the gripping devices, said supporting frame having a groove adapted to guide the gripping devices in a determined path, said groove comprising an inclined portion, means adapted to move said gripping devices along said groove and up the incline therein, and means actuated by said preceding means to assist in moving the gripping devices up the incline in said groove.

2. An automatic bobbin doffer for spinning machines including the doffer frame, bobbin-gripping devices adapted to remove the full bobbins from the spinning machine, a frame to support the gripping devices, said supporting frame having a groove adapted to guide the gripping devices in a determined path, said groove comprising an inclined portion, a chain to move said gripping devices along said groove and up the incline therein, and means actuated by said chain to assist in moving the gripping devices up the incline in said groove.

3. An automatic bobbin doffer for spinning machines including the doffer frame, means to place the empty bobbins into operative position on said spinning machine, a plurality of bobbin-gripping devices each adapted to intermittently remove a full bobbin from the spinning machine, a hook in said doffer frame adapted to engage the spinning machine, an actuating device adapted to operate said hook, and means to intermittently operate said actuating device and hook, to intermittently move the doffer along the spinning machine.

4. In a portable doffer, the combination of a traveling framework, a doffing mechanism carried by said framework, and means carried by said framework for preventing the doffing mechanism from engaging the strands extending from the drawing rolls.

5. In a portable doffer, the combination of a traveling framework, a doffing device carried by said framework, and a member carried by said framework in advance of the operative position of the doffing device, for moving the yarn out of the reach of said doffing device.

6. In a portable doffer, the combination of a traveling framework, a doffing device carried by said framework, and an inclined member carried by said framework in advance of the operative position of said doffing device, for moving the yarn out of the way of said doffing device.

7. In a portable doffer, the combination of a traveling framework, a doffing device carried by said framework, and a beater carried by said framework for moving the yarn out of the way of the doffing device.

8. In a doffing machine, in combination, an upright guide arranged to direct bobbins onto the spindles of a spinning frame, a magazine for empty bobbins, located at one side of or out of alinement with said guide, and means comprising a pair of rotary supporting elements and an endless conveyer running over said elements for transferring bobbins singly and successively from said magazine to said upright guide.

9. A doffing machine comprising an upright guide-tube adapted to direct empty bobbins onto spindles, a magazine for empty bobbins, located in a plane below the upper end of said guide-tube, and an endless conveyer having devices thereon forming receptacles for single bobbins, said devices being arranged to receive bobbins from said magazine and elevate the bobbins to a point adjacent to the upper end of said guide-tube.

10. The combination with a spinning frame having a row of spindles, of a doffer arranged to travel along the spinning frame, in a direction parallel to said row of spindles, an endless guide disposed parallel to said row of spindles, an endless element mounted to travel adjacent to said guide, and in a direction parallel to said row of spindles, bobbin-grasping devices carried by said element and guided by said guide toward and away from the spindles on the spinning frame, and means for operating said bobbin-grasping devices at the proper intervals.

11. In a doffer, a bobbin-grasping device comprising a pair of jaws and spring means tending to close said jaws, means for causing said bobbin-grasping device to travel whereby to remove a bobbin from a spindle, and means acting on said grasping device to cause the latter to exert additional pressure upon the bobbin just as the bobbin is being removed from the spindle.

12. A doffer having a pair of bobbin-grasping jaws, spring means tending to move said jaws toward each other, and means for exerting additional pressure on said jaws during the removal of a bobbin from its spindle.

13. In a doffer, in combination, an endless traveling member, a bobbin-grasping device mounted thereon and comprising a pair of jaws and spring means tending to move said jaws toward each other, and stationary cam means arranged to exert additional pressure on said jaws during the removal of a bobbin from its spindle.

14. In a doffer, a framework, a member reciprocably mounted therein, a shear-blade fixed to said member, a pivoted shear-blade mounted on said member, means for reciprocating said member, and stationary cam means acting to open and close said pivoted shear-blade in the reciprocation of said member.

15. In a doffer, a movably mounted member, a stationary shear-blade and a pivoted shear-blade carried by said member, and stationary means arranged to operate said pivoted shear-blade during the movement of said member.

16. In a doffer arranged to travel along a spinning frame, a stationary support having a slotted cam plate thereon, a shaft mounted in said support for longitudinal reciprocation, a shear-blade fixed on said shaft, a pivoted shear-blade carried by said shaft and having a projection lying in the slot in said cam plate, and means for reciprocating said shaft to open and close said pivoted shear blade.

17. In a doffer arranged to travel along a spinning frame, in combination, a framework, a donning tube stationarily mounted therein, and a bobbin-seating device movable with relation to said framework and spaced away from said donning tube a distance equal to the distance between two adjacent spindles on the spinning frame.

18. In a doffer arranged to travel along a spinning frame, in combination, a guide arranged to direct onto spindles bobbins descending by gravity, and a bobbin-seating device spaced from said guide the distance between two adjacent spindles.

In witness whereof, we have hereunto set our hands and seals at Indianapolis, Indiana, this 21 day of April, A. D. one thousand nine hundred and eight.

HUMPHREY WILLIAMS. [L. S.]
JOHN H. WILLIAMS. [L. S.]

Witnesses:
F. W. WOERNER.
L. B. WOERNER.